(12) United States Patent
Takasaki (10) Patent No.: US 9,523,592 B2
(45) Date of Patent: Dec. 20, 2016

(54) ROTATION DETECTOR

(71) Applicant: DENSO CORPORATION, Kariya, Aichi-pref. (JP)

(72) Inventor: Mitsuru Takasaki, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/794,999

(22) Filed: Jul. 9, 2015

(65) Prior Publication Data

US 2016/0011011 A1    Jan. 14, 2016

(30) Foreign Application Priority Data

Jul. 11, 2014   (JP) ................................ 2014-143088

(51) Int. Cl.

| | |
|---|---|
| *G01D 5/14* | (2006.01) |
| *G01P 3/48* | (2006.01) |
| *G01D 11/24* | (2006.01) |
| *G01P 1/02* | (2006.01) |
| *G01P 3/481* | (2006.01) |
| *G01D 11/30* | (2006.01) |

(52) U.S. Cl.
CPC .............. *G01D 11/245* (2013.01); *G01D 5/145* (2013.01); *G01D 11/30* (2013.01); *G01P 1/026* (2013.01); *G01P 3/481* (2013.01); *G01P 3/48* (2013.01)

(58) Field of Classification Search
CPC ......... G01D 5/145; G01D 11/245; G01D 3/48

USPC .......................................... 324/207.25, 207.2
See application file for complete search history.

(56) References Cited

U.S. PATENT DOCUMENTS

| | | | |
|---|---|---|---|
| 2006/0260418 A1* | 11/2006 | Tsuge ...................... | G01P 1/026 |
| | | | 73/862.331 |
| 2013/0106408 A1 | 5/2013 | Tsuge et al. | |
| 2015/0040662 A1 | 2/2015 | Takasaki | |

FOREIGN PATENT DOCUMENTS

| | | |
|---|---|---|
| JP | 2013-096749 | 5/2013 |
| JP | 2015-031663 | 2/2015 |

* cited by examiner

*Primary Examiner* — Reena Aurora
(74) *Attorney, Agent, or Firm* — Harness, Dickey & Pierce, P.L.C.

(57) ABSTRACT

A rotation detector includes a sensor element, a signal wire connected to the sensor element, the signal wire transmitting the rotation detecting signal, a sensor coating portion integrally coating the sensor element and an end of the signal wire connected to the sensor element, and a sensor attachment member at least supporting a part of the sensor coating portion and a part of the signal wire. The signal wire includes a curved portion. The sensor attachment member has a surface provided with depression portions. When the sensor attachment member is being molded, the depression portions are engaged with a pair of guide members which protrude toward the curved portion in a cavity of a molding die in a direction perpendicular to a surface including the curved portion, and the guide members protrude in directions opposite to each other.

6 Claims, 5 Drawing Sheets

ROTATION DETECTOR

CROSS REFERENCE TO RELATED APPLICATION

This application is based on Japanese Patent Application No. 2014-143088 filed on Jul. 11, 2014, the disclosure of which is incorporated herein by reference.

TECHNICAL FIELD

The present disclosure relates to a rotation detector which detects a rotation state of a rotation member.

BACKGROUND

A rotation detector which detects a rotation state of a wheel is used to execute a travelling control of a vehicle. The rotation detector includes a magnetic sensor element, and is mounted to a steering arm to approach a sensor rotor of the wheel. When the sensor rotor rotates with the wheel, a pulse generated in the magnetic sensor element according to a rotation speed of the wheel, and the rotation detector can detect the rotation state of the wheel.

JP 2013-96749A (US 2013/0106408 A1) discloses a conventional technology correlative to the above rotation detector. Specifically, JP 2013-96749A discloses that the rotation detector includes a sensor body portion which is a signal processing component including the magnetic sensor element, and the signal processing component is coated by a resin molding material. When the sensor body portion is molded by integrally molding the signal processing component connected to a signal wire by utilizing the resin molding material, the signal processing component is supported by a support member. Therefore, the signal processing component is not displaced in the sensor body portion, and an accuracy of a position of the signal processing component can be improved.

SUMMARY

However, in the rotation detector, it is likely that an attachment member which mounts the signal processing component and a part of the signal wire to the vehicle is integrally molded by the resin molding material. When the attachment member is being molded, the signal processing component and a part of the signal wire connected to the signal processing component are placed at positions in a cavity of a molding die, and a melted resin molding material is supplied into the cavity to mold the attachment member by an inserting molding. In this case, the signal wire is readily moved according to a pressure of the resin molding material, and it is possible that the resin molding material is solidified after the signal wire is moved from a reference position. In the cavity, when the resin molding material is solidified after the signal wire is displaced, a stress is always applied to the signal wire after being produced. Therefore, the signal wire is readily damaged. Further, it is possible that a life of the signal wire is shortened. When the signal wire is displaced, a thickness of the attachment member is not uniform, and a strength of the attachment member is deteriorated. In particular, when the signal wire is displaced such that the signal wire is exposed to an outer peripheral surface of the attachment member, the strength of the attachment element is sharply deteriorated.

It is obvious that a displacement of the signal wire of when the attachment member is being molded is generated at a curved position of the signal wire due to a bending of the signal wire. When the curved position of the signal wire is generated, a tension is difficult to be generated at the curved position, and the curved position is further readily bended by a flow of the resin molding material.

The present disclosure is made in view of the above matters, and it is an object of the present disclosure to provide a rotation detector which can prevent a deterioration of a strength of a sensor attachment member.

According to an aspect of the present disclosure, a rotation detector includes a sensor element, a signal wire, a sensor coating portion, and a sensor attachment member. The sensor element generates a rotation detecting signal based on a rotation state of a rotation member. The signal wire is connected to the sensor element and transmits the rotation detecting signal. The sensor coating portion integrally coats the sensor element and an end of the signal wire connected to the sensor element. The sensor attachment member that is made of a resin molding material at least supports a part of the sensor coating portion and a part of the signal cable. The signal wire includes a curved portion that is curved in the sensor attachment member. The sensor attachment member has a surface provided with depression portions. When the sensor attachment member is being molded, the depression portions are engaged with a pair of guide members which protrude toward the curved portion in a cavity of a molding die in a direction perpendicular to a surface including the curved portion, and the guide members protrude in directions opposite to each other.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Embodiment

Referring to FIGS. 1 to 8, a wheel-speed sensor 1 that is a rotation detector according to an embodiment of the present disclosure will be described. In addition, as shown in FIGS. 6A and 6B, guide protrusions 73e and 74d are indicated in a cross section of the wheel-speed sensor 1.

Figure 1:
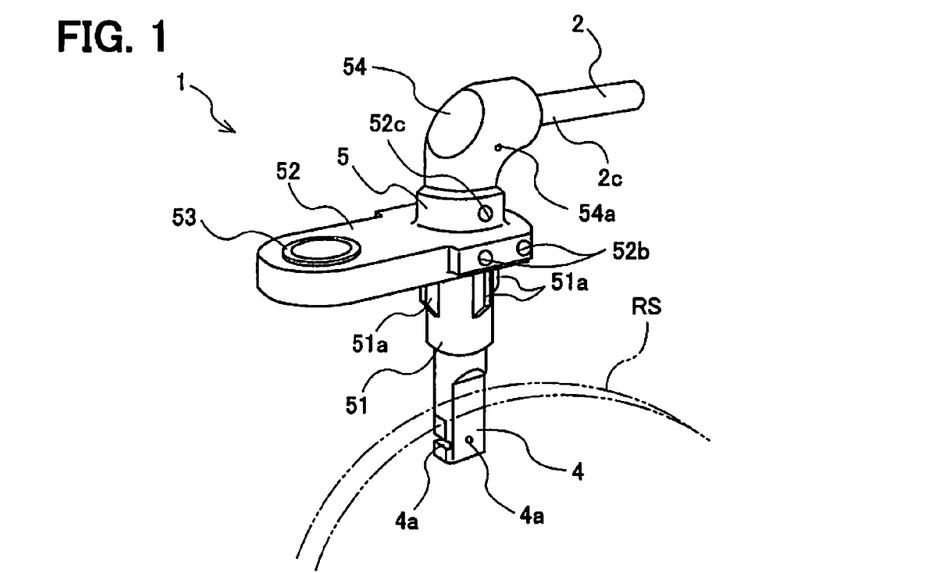
FIG. 1 is a perspective view showing a wheel-speed sensor of when being placed at a position in the vicinity of a sensor rotor, according to an embodiment of the present disclosure.

The wheel-speed sensor 1 is mounted to a vehicle to detect a rotation speed of a wheel. As shown in FIG. 1, the wheel-speed sensor 1 includes a signal cable 2 connected to a sensor element 3, a sensor coating portion 4 received in the sensor element 3, and a sensor housing 5 integrally (seamlessly) bonded to the signal cable and the sensor coating portion 4. In this case, the signal cable 2 is a signal wire, and the sensor housing 5 is a sensor attachment member.

The wheel-speed sensor 1 is mounted to a steering arm (not shown) of the vehicle by the sensor housing 5. Therefore, as shown in FIG. 1, the sensor coating portion 4 is placed at a position opposite to a sensor rotor RS by a predetermined distance. The sensor rotor RS that is a rotation member integrally rotates with the wheel. When the sensor rotor RS rotates with a hub (not shown) of the wheel, in the sensor element 3, a pulse signal having a frequency correlative to a rotation speed of the sensor rotor RS is generated. In this case, the pulse signal is a rotation detecting signal. The pulse signal generated in the sensor element 3 is transmitted to an ABS controller (not shown) of the vehicle through the signal cable 2. The ABS controller detects a speed of the wheel based on the pulse signal.

Figure 4:
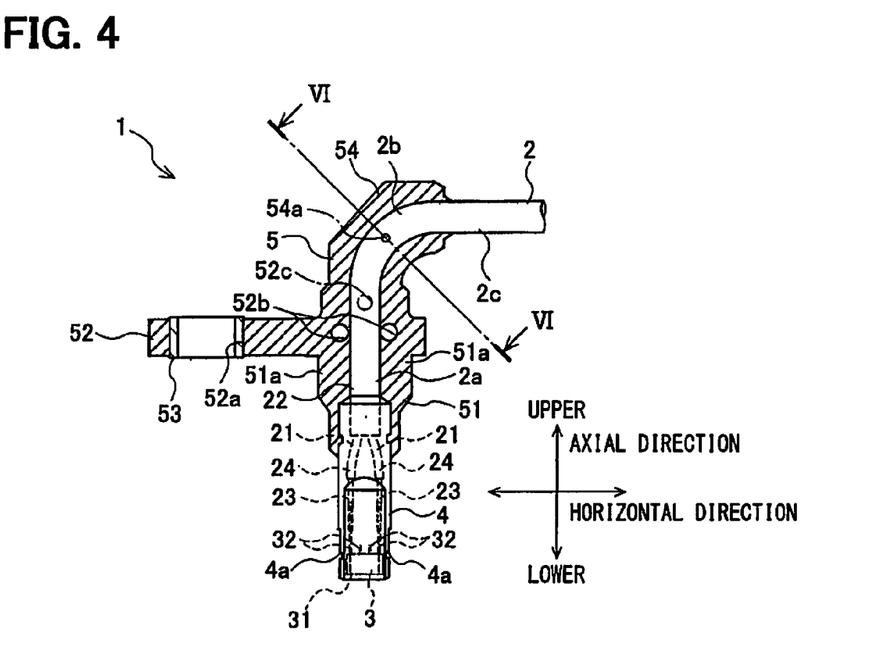
FIG. 4 is a cross-sectional view showing the wheel-speed sensor of when being viewed along an axis of a signal cable.

As shown in FIG. 4, the sensor element 3 includes a detection body 31 and plural lead frames 32 protruding from the detection body 31. The detection body 31 is a detection circuit which includes a magnetoelectric conversion element such as a Hall-effect IC and is liquid-tightly sealed by a resin molding material. However, the detection body 31 is not limited to the detection circuit. The detection circuit may include a magnetoresistive element.

The signal cable 2 includes an insulation member 22 and a pair of signal transmission wires 21 which is coated by the insulation member 22. Each of the pair of the signal transmission wires 21 includes an electrical wire 23 and an insulation body 24. In this case, the electrical wire 23 is a combination of plural core wires which are made of a conductive metal material, and is coated by the insulation body 24. The insulation body 24 is made of a resin molding material, and the signal transmission wires 21 are insulated from each other. The electrical wire 23 is connected to one of the lead frames 32 by a welding or a soldering.

The sensor element 3 and the signal cable 2 are integrally (seamlessly) molded by an epoxy resin after the sensor element 3 and the signal cable 2 are connected to each other, and then the sensor coating portion 4 is formed. The sensor coating portion 4 integrally (seamlessly) coats the sensor element 3 and an end of the signal cable 2 connected to the sensor element 3. When the sensor element 3 and the signal cable 2 are being coated, the sensor element 3 is supported by a supporting member (not shown) so as to prevent a shift of a position of the sensor element 3. The sensor coating portion 4 has an outer peripheral surface provided with plural groove portions 4a which are traces of the support member generated in a molding. A connection method of the signal cable 2 and the sensor element 3, and a coating method utilizing the sensor coating portion 4, are as the same as those disclosed in JP 2013-96749A.

As shown in FIG. 4, the signal cable 2 is connected to the sensor element 3 in the sensor housing 5. The signal cable 2 includes a straight portion 2a, a curved portion 2b, and a leading portion 2c. In the sensor housing 5, the straight portion 2a is connected to the sensor element 3 and extends in an axial direction. The curved portion 2b is connected to the straight portion 2a, and is a curved shape curved by substantially 90 degrees in the sensor housing 5. The leading portion 2c which is a linear shape is connected to the curved portion 2b, and extends towards an exterior of the sensor housing 5 in a direction substantially parallel to a horizontal direction.

Figure 3:
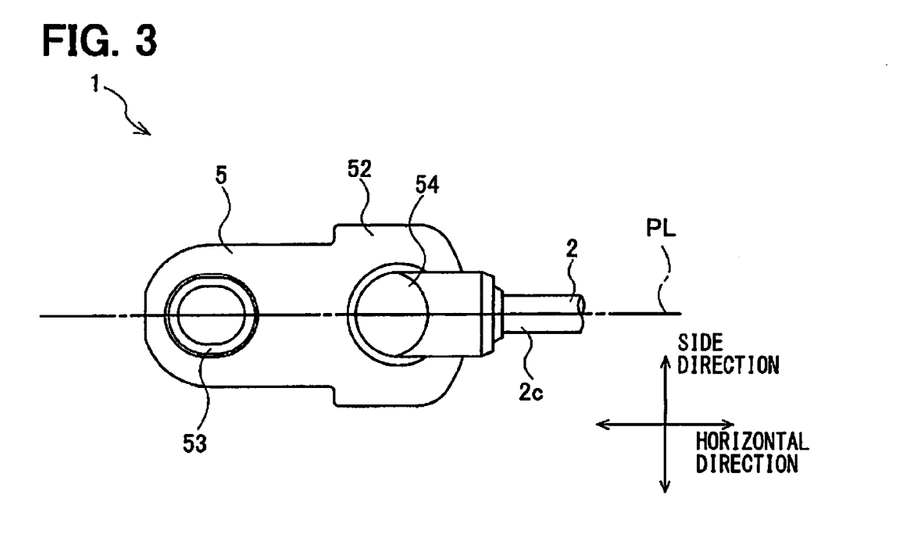
FIG. 3 is a plan view showing the wheel-speed sensor in FIG. 2.
Figure 5:
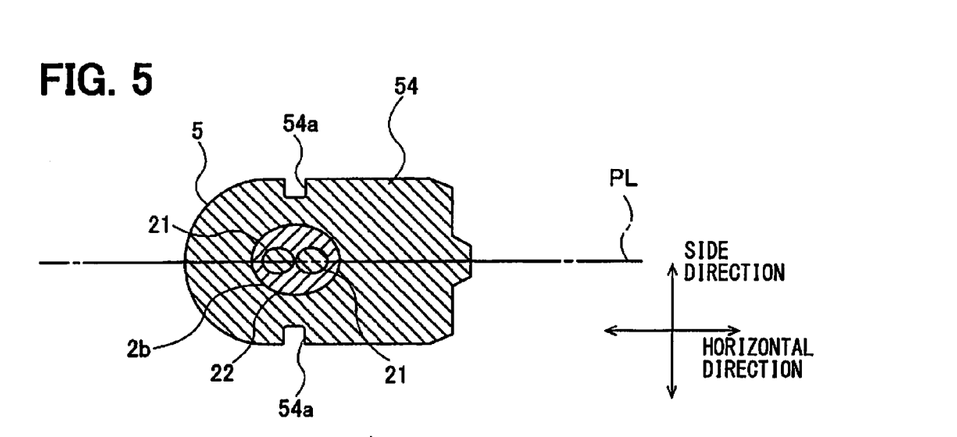
FIG. 5 is a cross-sectional view taken along a line V-V in FIG. 2.

As shown in FIGS. 3 and 5, an imagination surface including the curved portion 2b is referred to as a signal-wire surface PL.

The sensor housing 5 is formed by an injection molding by utilizing a resin molding material that has a thermoplasticity. In this case, the resin molding material may be a polybutylene terephthalate (PBT). The sensor housing 5 supports an upper portion of the sensor coating portion 4 and an end portion of the signal cable 2 connected to the sensor element 3.

Figure 2:
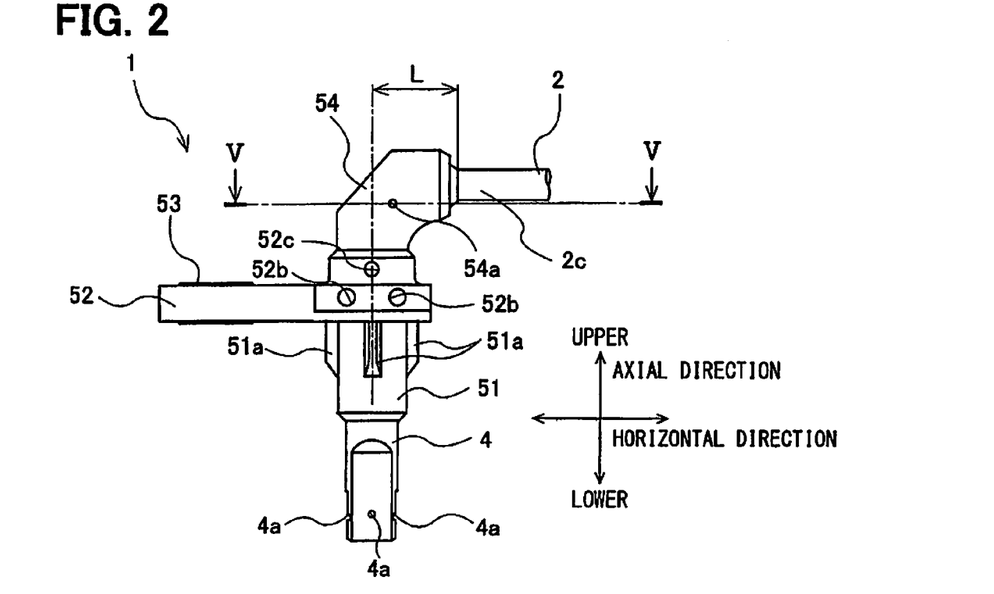
FIG. 2 is a front view showing the wheel-speed sensor in FIG. 1.

As shown in FIGS. 2 and 3, the sensor housing 5 includes a sensor supporting portion 51 which supports the sensor coating portion 4. The sensor supporting portion 51 is a substantially cylindrical shape, and includes plural attachment pieces 51a which protrude from an out peripheral surface of the sensor supporting portion 51 outwardly in a radial direction of the sensor supporting portion 51. When the wheel-speed sensor 1 is mounted to the vehicle, the attachment pieces 51a are used to locate the sensor housing 5.

An attachment stay 52 that is a flat plate is placed at an upper position of the sensor supporting portion 51. The attachment stay 52 extends from a center that is a center axis of the straight portion 2a of the signal cable 2, in a radial direction of the straight portion 2a. According to the present embodiment, since the center axis of the straight portion 2a is a center axis of the signal wire connected to the sensor element 3, the attachment stay 52 also extends from a center axis of the signal cable 2 in a radial direction of the signal cable 2. As shown in FIG. 4, the attachment stay 52 is provided with an attachment hole 52a penetrating the attachment stay 52 in a thickness direction of the attachment stay 52. As shown in FIG. 3, a center of the attachment hole 52a is placed at a position on the signal-wire surface PL. An attachment collar 53 that is made of a metal material is fastened to the attachment hole 52a by an inserting molding.

When the wheel-speed sensor 1 is mounted to the vehicle, an attachment bolt (not shown) is inserted into the attachment collar 53. The attachment collar 53 has a length greater than a thickness of the attachment stay 52 in an axial direction of the attachment collar 53. Therefore, as shown in FIG. 2, an upper end surface of the attachment collar 53 and a lower end surface of the attachment collar 53 protrude outward from an upper end of the attachment stay 52 and a lower end of the attachment stay 52, respectively. Thus, the attachment collar 53 can receive a fastening load of when the attachment bolt is fastened to the attachment collar 53.

Figure 7:
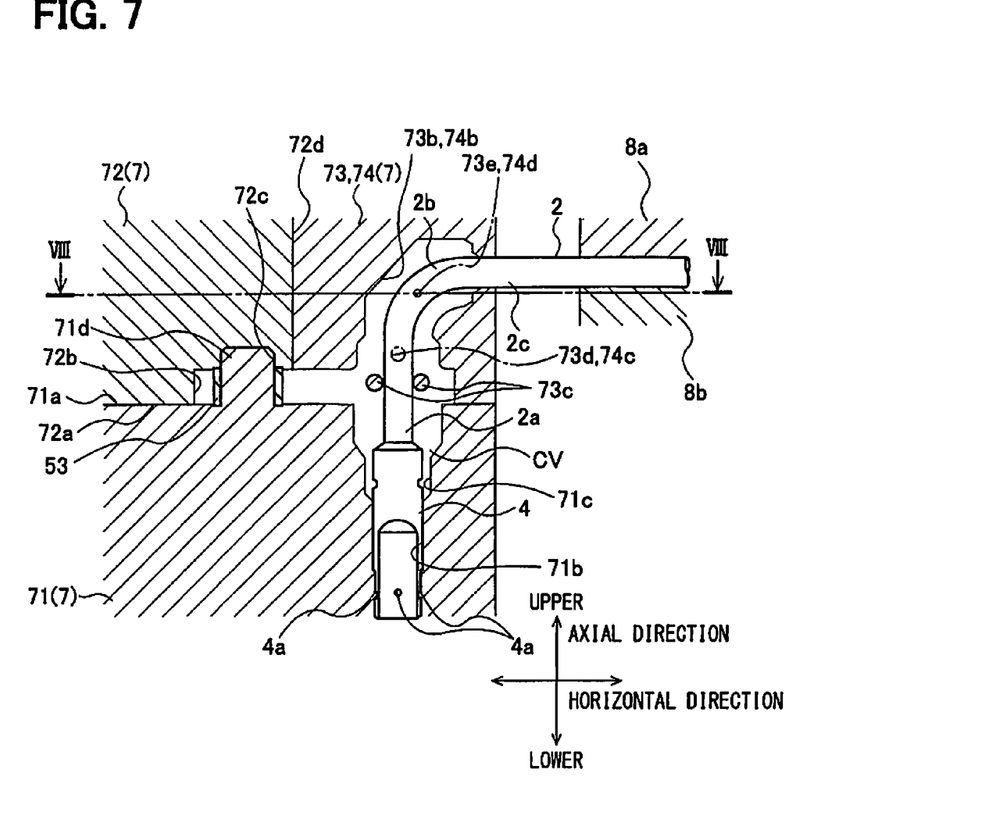
FIG. 7 is a schematic diagram showing a configuration of a molding die which forms the sensor housing.

As shown in FIG. 7, a pair of first guide pins 73c protrudes in a cavity CV of a molding die 7, so as to suppress a first movement of the straight portion 2a of the signal cable 2 generated due to an entering of a melted resin material when the sensor housing 5 is being molded. Specifically, the pair of the first guide pins 73c is provided to suppress the first movement of the straight portion 2a in a horizontal direction shown in FIG. 2. Thus, the attachment stay 52 is provided with a pair of first pin holes 52b which is a trace of the pair of the first guide pins 73c. Since the pair of the first guide pins 73c penetrates the cavity CV and the straight portion 2a is interposed between the first guide pins 73c, both the first pin holes 52b penetrate the attachment stay 52.

As shown in FIG. 7, a pair of second guide pins 73d, 74c protrudes in the cavity CV from an upper position of the first pair of the first guide pins 73c, so as to suppress a second movement of the straight portion 2a of the signal cable 2 generated due to the entering of the melted resin material when the sensor housing 5 is being molded. Specifically, the pair of the second guide pins 73d, 74c is provided to suppress the second movement of the straight portion 2a in a side direction shown in FIG. 8. Thus, a pair of second pin holes 52c is provided in the sensor housing 5 and is placed at an upper position of the pair of the first pin holes 52b. As shown in FIGS. 1 and 2, a single second pin hole 52c is indicated. The pair of the second guide pins 73d, 74c protrudes toward the straight portion 2a. Specifically, the second guide pins 73d 74c protrude in the side direction shown in FIG. 8. and protrude in directions opposite to each other. In other words, one of the second guide pin 73d protrudes in the side direction from a first wall of the cavity CV toward the straight portion 2a, the other one of the second guide pin 74c protrudes in the side direction from a second wall of the cavity CV toward the straight portion 2a. In this case, the first wall and the second wall are opposite to each other in the side direction. Thus, the second pin holes 52c communicate an exterior of the sensor housing 5 with the straight portion 2a.

Figure 6A:
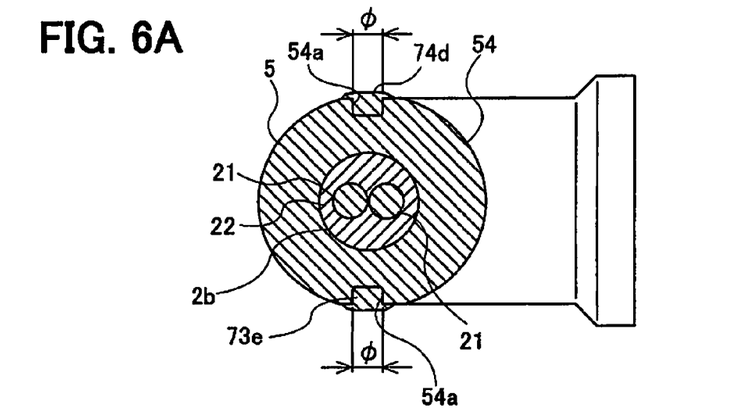
FIG. 6A is a cross-sectional view taken along a line VI-VI in FIG. 4.
Figure 8:
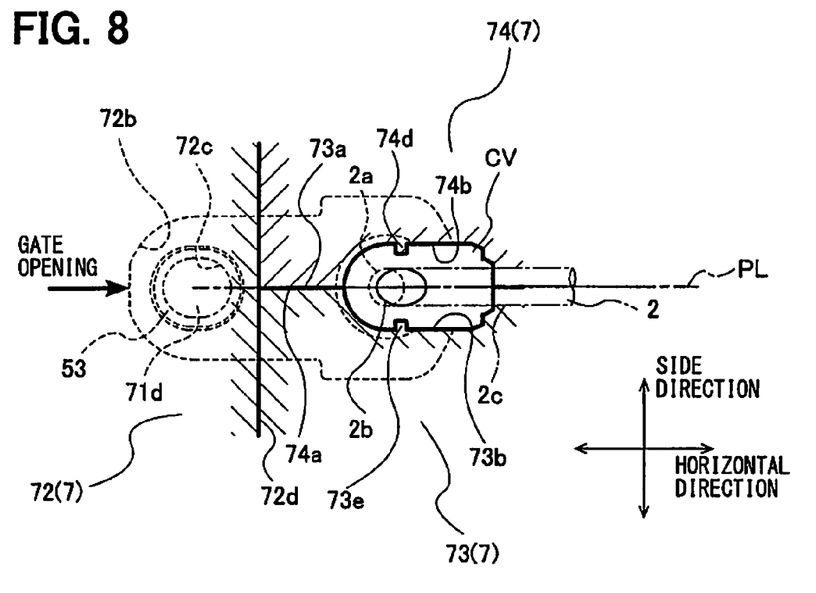
FIG. 8 is a cross-sectional view taken along a line VIII-VIII in FIG. 7.

The sensor housing 5 is provided with a corner portion 54 that is placed at an upper position of the attachment stay 52. The corner portion 54 is curved and covers the curved portion 2b. As shown in FIG. 8, a pair of guide protrusions 73e, 74d protrudes in the cavity CV, so as to suppress a movement of the curved portion 2b generated due to the entering of the melted resin material when the sensor housing 5 is being molded. Specifically, the pair of the guide protrusions 73e, 74d are provided to suppress the movement of the curved portion 2b in the side direction shown in FIG. 8. According to the present embodiment, the pair of guide protrusions 73e, 74d is a guide member. Thus, as shown in FIG. 5, a pair of guide traces 54a is formed on a surface of the corner portion 54. According to the present embodiment, the pair of the guide traces 54a is a depression portion, and the pair of the guide traces 54a is engaged with the guide protrusions 73e, 74d. The pair of the guide protrusions 73e, 74d protrudes toward the curved portion 2b in a direction perpendicular to the signal-wire surface PL. Further, the guide protrusions 73e, 74d protrude in directions opposite to each other. As shown in FIG. 6A, the pair of the guide protrusions 73e, 74d has a length in the side direction which is established such that the guide protrusions 73e, 74d are not in contact with the signal cable 2 at the same time when the sensor housing 5 is being molded. Thus, as shown in FIG. 5, the pair of the guide traces 54a is separated from the curved portion 2b by a predetermined distance without penetrating the corner portion 54. In other words, the curved portion 2b is interposed between the guide traces 54a.

According to the present embodiment, the guide protrusions 73e, 74d are a cylindrical shape, and have a circular shape in a cross section parallel to the signal-wire surface PL. As shown in FIG. 6A, it is preferable that a diameter $\phi$ of the pair of the guide protrusions 73e, 74d is set to be a minimum value in a range where the movement of the curved portion 2b can be prevented, so as to prevent a strength of the sensor housing 5 being deteriorated due to the guide traces 54a.

Figure 6B:
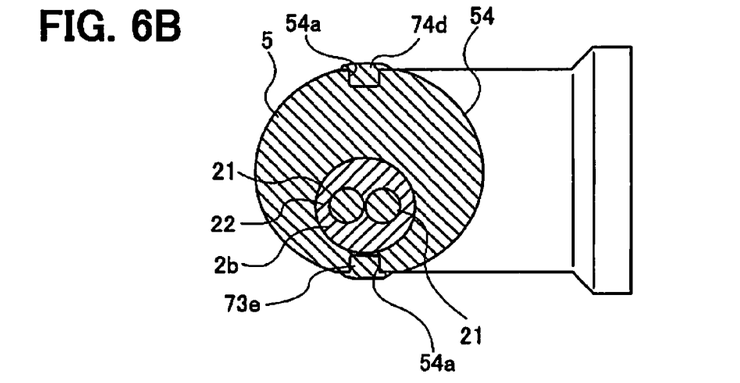
FIG. 6B is a cross-sectional view of FIG. 6A of when the signal cable removes from a center axis of a sensor housing.

When the sensor housing 5 is being molded, since the pair of the guide protrusions 73e, 74d protrudes in the cavity CV, the curved portion 2b is supported by the guide protrusions 73e, 74d, and the movement of the curved portion 2b is suppressed. As shown in FIG. 6B, when the sensor housing 5 is being molded and when the curved portion 2b is moved due to the entering of the melted resin material, the curved portion 2b is in contact with the pair of the guide protrusions 73e, 74d without being exposed to an outer peripheral surface of the sensor housing 5. Therefore, the strength of the sensor housing 5 is sufficiently ensured.

Referring to FIGS. 7 and 8, the molding die 7 which is used when the sensor housing 5 is being molded will be described. The molding die 7 shown in FIGS. 7 and 8 is an example, and any other modifications of the molding die 7 are acceptable so as to execute a molding of the sensor housing 5. As shown in FIG. 7, solid lines indicate outer peripheral surfaces of component dies 71, 72, 73, 74, and thin lines indicate walls of the cavity CV formed in the molding die 7. As shown in FIG. 8, thick lines indicate mold-split surfaces of the component dies 72, 73, 74.

The molding die 7 includes the component dies 71, 72, 73, 74 which have a lower die 71, an upper die 72 covering an upper portion of the lower die 71, a first movable die 73, and a second movable die 74. The first movable die 73 and the second movable die 74 are placed at upper positions of the lower die 71 and are split from each other in a side direction.

The lower die 71 includes an upper end surface 71a provided with a sensor engagement portion 71b. The sensor engagement portion 71b is a depression portion that is a shape of the sensor coating portion 4 and is formed in the upper end surface 71a. The sensor coating portion 4 can be engaged with the sensor engagement portion 71b from an upper position of the sensor engagement portion 71b. The sensor engagement portion 71b has a function to position the sensor coating portion 4 when the sensor housing 5 is being molded.

A support shape portion 71c that is a depression portion formed to have a shape of the sensor supporting portion 51 is placed at an upper position of the sensor engagement portion 71b and is connected to the sensor engagement portion 71b. The support shape portion 71c forms a part of the cavity CV.

The upper end surface 71a of the lower die 71 is further provided with a protrusion portion 71d. The protrusion portion 71d is a substantially columnar shape, and protrudes upwardly from the upper end surface 71a. When an inserting molding of the attachment collar 53 is being executed, the protrusion portion 71d is positioned by being engaged with an inner peripheral surface of the attachment collar 53.

The upper die 72 placed at an upper position of the lower die 71 moves downward such that the component dies are clamped to be in a clamped state where the upper die 72 is in contact with the lower die 71. In this case, a lower end surface 72a of the upper die 72 is in contact with the upper end surface 71a of the lower die 71. When the upper die 72 upwardly moves from the clamped state, the component dies are open.

The lower end surface 72a is provided with a stay shape portion 72b that is a depression portion being a shape of the attachment stay 52. The stay shape portion 72b forms a part of the cavity CV. As shown in FIG. 8, when the sensor housing 5 is being molded, the stay shape portion 72b forms a shape of an end portion of the attachment stay 52.

The upper die 72 is provided with a protrusion engagement portion 72c connected to the stay shape portion 72b. When the sensor housing 5 is being molded, the protrusion engagement portion 72c is engaged with the protrusion portion 71d.

The first movable die 73 and the second movable die 74 which are a pair of movable molding dies are placed at positions opposite to each other, such that a first mold-split surface 73a of the first movable die 73 and a second mold-split surface 74a of the second movable die 74 are located on the signal-wire surface PL. As shown in FIG. 8, the first movable die 73 and the second movable die 74 are in slidable contact with the upper end surface 71a of the lower die 71 and a side end surface 72d of the upper die 72. The first movable die 73 and the second movable die 74 move in the side direction to open or close. Specifically, the first movable die 73 and the second movable die 74 move toward each other to close, and move to separate from each other to open. The first mold-split surface 73a is provided with a first housing shape portion 73b that is a depression portion, and the second mold-split surface 74a is provided with a second housing shape portion 74b that is a depression portion. The first housing shape portion 73b and the second housing shape portion 74b indicate a shape of a base part of the attachment stay 52 and a shape of the corner portion 54, and forms a part of the cavity CV.

The pair of the first guide pins 73c protrudes from the first housing shape portion 73b in the side direction. The pair of the first guide pins 73c is integrally (seamlessly) bonded to the first movable die 73. According to the present embodiment, the pair of the first guide pins 73c may protrude from the second housing shape portion 74b. Alternatively, one of the pair of the first guide pins 73c protrudes from the first housing shape portion 73b, and the other one of the pair of the first guide pins 73c protrudes from the second housing shape portion 74b.

The second guide pin 73d protrudes from the first housing shape portion 73b in the side direction, and the second guide pin 74c protrudes from the second housing shape portion 74b in the side direction. The second guide pin 73d is integrally (seamlessly) bonded to the first movable die 73, and the second guide pin 74c is integrally (seamlessly) bonded to the second movable die 74.

The guide protrusion 73e protrudes from the first housing shape portion 73b in the side direction, and the guide protrusion 74d protrudes from the second housing shape portion 74b in the side direction. The guide protrusion 73e is integrally (seamlessly) bonded to the first movable die 73, and the guide protrusion 74d is integrally (seamlessly) bonded to the second movable die 74.

Hereafter, a molding method of the sensor housing 5 by utilizing the molding die 7 will be described. When the sensor housing 5 is molded, the sensor element 3 is connected to the signal cable 2, and the sensor element 3 and the signal cable 2 are coated by the sensor coating portion 4 and then placed at a position in the molding die 7. Specifically, as shown in FIG. 7, the sensor coating portion 4 is engaged with the sensor engagement portion 71b of the lower die 71, a specified position of the signal cable 2 is supported by a pair of clamp jigs 8a, 8b The curved portion 2b is formed from a predetermined position of the signal cable 2 by bending the predetermined position at a predetermined curvature. The protrusion portion 71d of the lower die 71 is engaged with the attachment collar 53.

Then, the upper die 72 is moved downward to be in contact with the lower die 71, and the first movable die 73 and the second movable die 74 are in contact with each other. Therefore, the first guide pins 73c, the second guide pins 73d, 74c, and the guide protrusions 73e, 74d protrude in the cavity CV. The first guide pins 73c, the second guide pins 73d, 74c, and the guide protrusions 73e, 74d are placed at positions to fix the signal cable 2. In this case, the signal cable 2 cannot be moved. Then, the resin molding material that is melted is injected from a gate opening formed on the stay shape portion 72b of the upper die 72. In this case, it is preferable that an injection pressure of the resin molding material is a uniform pressure so as to reduce a movement of the signal cable 2 in the cavity CV.

When the resin molding material is solidified, the component dies are open by upwardly moving the upper die 72 and moving the first movable die 73 and the second movable die 74 in the side direction. The sensor housing 5 supporting the sensor coating portion 4 and the signal cable 2 is formed by the resin molding material that is solidified. The attachment collar 53 is inserted into the sensor housing 5.

According to the present embodiment, the pair of the guide protrusions 73e, 74d protrudes toward the curved portion 2b in a direction perpendicular to the signal-wire surface PL including the curved portion 2b, and the guide protrusions 73e, 74d protrude in directions opposite to each other. Therefore, the guide traces 54a are formed on a surface of the sensor housing 5. Since the pair of the guide protrusions 73e, 74d protrudes in the cavity CV, the movement of the curved portion 2b of when the sensor housing 5 is being molded is limited, and it can be reduced that the resin molding material is solidified in a case where the signal cable 2 is displaced in the sensor housing 5. Therefore, the signal cable 2 is not exposed from the outer peripheral surface of the sensor housing 5, and a deterioration of the strength of the sensor housing 5 can be prevented.

Since the deterioration of the strength of the sensor housing 5 is prevented, a distance L (shown in FIG. 2) from a center axis of the sensor supporting portion 51 to an outlet of the signal cable 2 can be shortened. Since the distance L is shortened, a displacement of the signal cable 2 relative to the sensor housing 5 can be suppressed.

Since the pair of the guide protrusions 73e, 74d protrudes in the cavity CV in a direction perpendicular to the signal-wire surface PL, a dimension of the guide trace 54a can be minimized, and the deterioration of the strength of the sensor housing 5 can be further prevented.

Since the pair of the guide protrusions 73e, 74d has the length in the side direction which is established such that the guide protrusions 73e, 74d are not in contact with the signal cable 2 at the same time when the sensor housing 5 is being molded, a depth of the guide trace 54a can be reduced, and the deterioration of the strength of the sensor housing 5 can be further prevented.

Since the guide protrusions 73e, 74d art not in contact with the signal cable 2 at the same time, a damage of an outer peripheral surface of the signal cable 2 generated due to the guide protrusions 73e, 74d can be prevented.

When the sensor housing 5 is being molded, the first movable die 73 and the second movable die 74 are placed to be opposite to each other such that the first mold-split surface 73a and the second mold-split surface 74a are placed on the signal-wire surface PL, the guide protrusion 73e is integrally (seamlessly) bonded to the first movable die 73, and the guide protrusion 74d is integrally (seamlessly) bonded to the second movable die 74. Therefore, when the first movable die 73 and the second movable die 74 are clamped, the guide protrusions 73e, 74d are protruded. Further, when the first movable die 73 and the second movable die 74 are open, the guide protrusions 73e, 74d are moved backward. Thus, it is unnecessary to provide slidable mechanisms to move the guide protrusions 73e, 74d in the first movable die 73 and the second movable die 74. Therefore, a configuration of the first movable die 73 and the second movable die 74 including the guide protrusions 73e, 74d is simplified, and the molding die 7 can be minimized.

The attachment stay 52 of the sensor housing 5 extends from the center that is the center axis of the straight portion 2a of the signal cable 2, in the radial direction of the straight portion 2a, and the attachment hole 52a is placed at a position on the signal-wire surface PL. Therefore, a position of the attachment hole 52a can be separated from a moving direction of the first movable die 73 and the second movable die 74. Thus, the first movable die 73 and the second movable die 74 can be moved without being disturbed by the attachment collar 53 that protrudes from end surfaces of the attachment stay 52, and a configuration of the molding die 7 can be simplified.

Since the sensor element 3 includes the Hall-effect IC, the sensor element 3 can be minimized, and the wheel-speed sensor 1 can minimized and lightened.

Figure 9A:
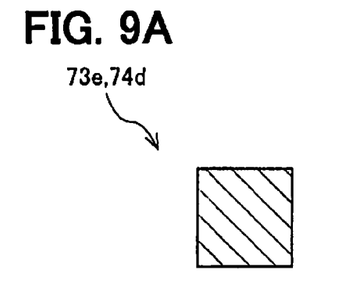
FIG. 9A is diagram showing a shape of a guide protrusion portion in a cross section of when the guide protrusion portion is cut in a direction perpendicular to a protrusion direction of the guide protrusion portion, according to a first modification example.

Shapes of the guide protrusions 73e, 74d in a cross section parallel to the signal-wire surface PL are not limited to be cylindrical. As shown in FIG. 9A, the guide protrusions 73e, 74d may be a square shape.

Figure 9B:
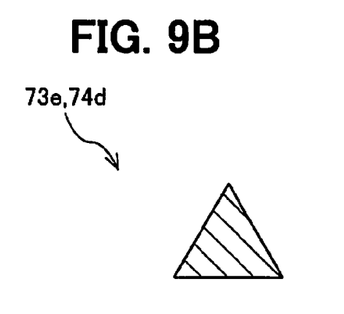
FIG. 9B is diagram showing the shape of the guide protrusion portion in a cross section of when the guide protrusion portion is cut in a direction perpendicular to the protrusion direction of the guide protrusion portion, according to a second modification example.

Alternatively, as shown in FIG. 9B, the guide protrusions 73e, 74d may be a triangular shape.

Figure 9C:
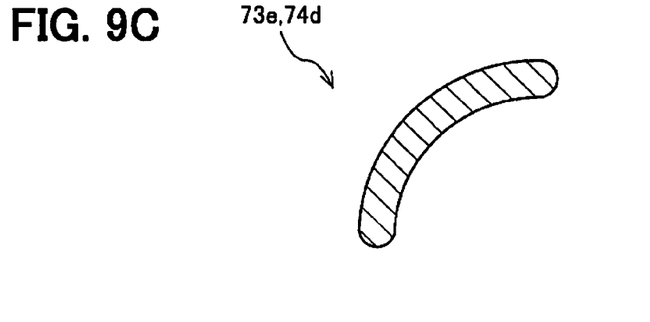
FIG. 9C is diagram showing the shape of the guide protrusion portion in a cross section of when the guide protrusion portion is cut in a direction perpendicular to the protrusion direction of the guide protrusion portion, according to a third modification example.

Alternatively, as shown in FIG. 9C, the guide protrusions 73e, 74d may be a bow shape which is similar to the curved portion 2b.

Other Embodiment

The present disclosure is not limited to the embodiment mentioned above, and can be modified or changed as follows.

The rotation detector according to the present disclosure is not limited to be mounted to the vehicle. For example, the rotation detector may be applied to a home electric appliance or an industrial machine so as to detect a rotation state of a rotation member.

The rotation detector according to the present disclosure is not limited to detect a rotation speed. For example, the rotation detector may detect a rotation number of a rotation member, a rotation acceleration of the rotation member, a rotation deceleration of the rotation member, or a rotation angle of the rotation member.

The guide protrusions 73e, 74d may be provided as members which are different from the first movable die 73 and the second movable die 74 and are slidable relative to the first movable die 73 and the second movable die 74.

The guide protrusions 73e, 74d may be in contact with the curved portion 2b of the signal cable 2 at the same time when the sensor housing is being molded, and the lengths of the guide protrusions 73e, 74d may be optional.

The center of the attachment hole 52a of the attachment stay 52 is unnecessary to be placed at a position of the signal-wire surface PL, and a part of the attachment hole 52a may be placed at a position of the signal-wire surface PL. The attachment hole 52a can be placed at any positions of the attachment stay 52 other than a position in the moving direction of the first movable die 73 and the second movable die 74.

Protruding directions of the guide protrusions 73e, 74d are not limited to be absolutely perpendicular to the signal-wire surface PL. When the movement of the curved portion 2b is properly limited when the sensor housing 5 is being molded and when the deterioration of the strength of the sensor housing 5 generated due to the guide trace 54a is not disturbed, the guide protrusions 73e, 74d may be slightly angled relative to the signal-wire surface PL.

A curved angle of the curved portion 2b in the sensor housing 5 is not limited to 90 degrees, and may be any degrees.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A rotation detector comprising:
    a sensor element generating a rotation detecting signal based on a rotation state of a rotation member;
    a signal wire connected to the sensor element, the signal wire transmitting the rotation detecting signal;
    a sensor coating portion integrally coating the sensor element and an end of the signal wire connected to the sensor element; and
    a sensor attachment member being made of a resin molding material, the sensor attachment member at least supporting a part of the sensor coating portion and a part of the signal wire, wherein
    the signal wire includes a curved portion that is curved in the sensor attachment member,
    the sensor attachment member has a surface provided with depression portions, and
    when the sensor attachment member is being molded, the depression portions are engaged with a pair of guide members which protrude toward the curved portion in a cavity of a molding die in a direction perpendicular to a surface including the curved portion, and the guide members protrude in directions opposite to each other.

2. The rotation detector according to claim 1, wherein the pair of the guide members has a length which is established in a case where the guide members are not in contact with the signal wire at the same time when the sensor attachment member is being molded.

3. The rotation detector according to claim 1, wherein the molding die includes a pair of movable molding dies, when the sensor attachment member is being molded, the movable molding dies are placed at positions opposite to each other, and mold-split surfaces of the movable molding dies are located on the surface including the curved portion, and the guide members are integrally bonded to the movable molding dies, respectively.

4. The rotation detector according to claim 3, wherein the sensor attachment member includes an attachment stay extending from a center that is a center axis of the signal wire connected to the sensor element in a radial direction of the signal wire, the attachment stay is provided with an attachment hole penetrating the attachment stay, and at least a part of the attachment hole is located on the surface including the curved portion.

5. The rotation detector according to claim 1, wherein the sensor element includes a Hall-effect IC.

6. The rotation detector according to claim 1, wherein the curved portion is interposed between the depression portions.

\* \* \* \* \*